United States Patent
Stadler et al.

(10) Patent No.: US 7,193,963 B2
(45) Date of Patent: Mar. 20, 2007

(54) METHOD FOR INPUTTING INFORMATION INTO A DATA STORAGE MEDIUM THAT IS OPTICALLY RECORDABLE AND READABLE

(75) Inventors: Stefan Stadler, Hamburg (DE); Jorn Leiber, Hamburg (DE); Annouschka Blazejewski, Hamburg (DE); Christoph Dietrich, Heidelberg (DE); Kay Schulte-Wieking, Heidelberg (DE); Steffan Noehte, Weinheim (DE)

(73) Assignee: Tesa Scribos GmbH, Heidelberg (DE)

( * ) Notice: Subject to any disclaimer, the term of this patent is extended or adjusted under 35 U.S.C. 154(b) by 543 days.

(21) Appl. No.: 10/480,836

(22) PCT Filed: Oct. 6, 2002

(86) PCT No.: PCT/EP02/06339

§ 371 (c)(1),
(2), (4) Date: Apr. 6, 2004

(87) PCT Pub. No.: WO02/103690

PCT Pub. Date: Dec. 27, 2002

(65) Prior Publication Data

US 2004/0202080 A1   Oct. 14, 2004

(30) Foreign Application Priority Data

Jun. 15, 2001  (DE) .............................. 101 28 901

(51) Int. Cl.
 *G11B 3/70* (2006.01)
(52) U.S. Cl. .................. 369/286; 369/288; 369/94; 369/275.1
(58) Field of Classification Search ................ 369/283, 369/286, 284, 288, 287, 103, 100, 94, 272, 369/59.11, 108, 275.1; 430/288, 332, 270.11; 428/64.4, 64.1; 264/1.7, 1.6; 365/151; 720/746
See application file for complete search history.

(56) References Cited

U.S. PATENT DOCUMENTS 3,288,389 A    11/1966   Gersch et al.

(Continued)

FOREIGN PATENT DOCUMENTS

DE    2312328    10/1974

(Continued)

OTHER PUBLICATIONS

Ramanujam et al., "Instant Holography" Applied Physics Letters, vol. 74 (21) pp. 3227-3229 (May 1999).

(Continued)

*Primary Examiner*—Ali Neyzari
(74) *Attorney, Agent, or Firm*—Nixon & Vanderhye P.C.

(57) ABSTRACT

In a method of entering information into an optically writable and readable data storage medium having a polymer film which can be changed locally by heating in order to store information and to which there is assigned an absorber dye (34) which is set up to absorb a write beam (36), at least partly, and to transfer the heat produced in the process, at least partly, locally to the polymer film, first of all the absorber dye is heated locally in a predetermined region of the polymer film in accordance with the information to be entered, specifically by means of a pulsed write beam (36). After that, the absorption properties of the absorber dye (34) are changed by means of light, to be specific preferably by means of a fixing beam (37) which bleaches (38) the absorber dye (34) in the written region of the polymer film.

21 Claims, 1 Drawing Sheet

U.S. PATENT DOCUMENTS

Figure 1:
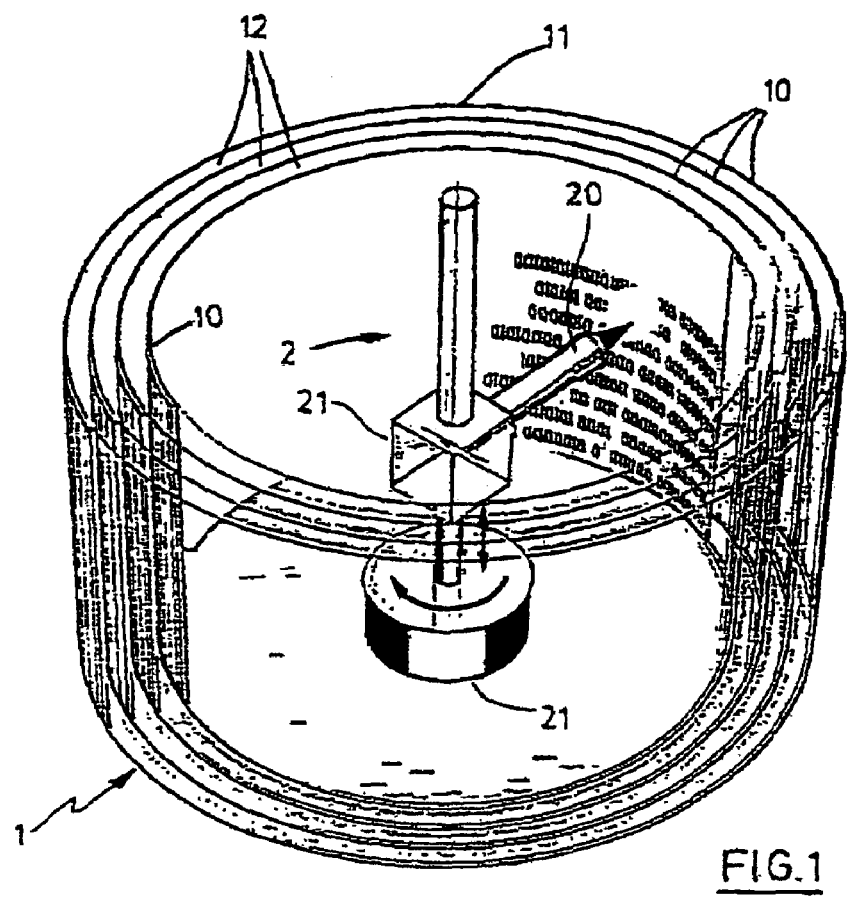

| | | |
|---|---|---|
| 3,823,276 A | 7/1974 | Maslowski et al. ...... 179/100.3 |
| 3,976,354 A | 8/1976 | Braitberg et al. ............. 350/3.5 |
| 4,069,049 A | 1/1978 | Reich et al. .................... 96/27 |
| 4,085,501 A | 4/1978 | Currie ......................... 29/593 |
| 4,252,400 A | 2/1981 | Bernal et al. .............. 350/3.63 |
| 4,320,489 A | 3/1982 | Crandall et al. ............. 369/111 |
| 4,548,889 A | 10/1985 | Nemoto et al. |
| 4,581,317 A | 4/1986 | Simmons, III .............. 430/270 |
| 4,599,718 A | 7/1986 | Nakagawa et al. ......... 369/100 |
| 4,638,335 A | 1/1987 | Smith et al. |
| 4,651,172 A | 3/1987 | Watanabe et al. ........ 346/135.1 |
| 4,773,060 A | 9/1988 | Shimada et al. ............ 369/100 |
| 4,800,112 A | 1/1989 | Kano et al. .................. 428/163 |
| 4,837,745 A | 6/1989 | Eich et al. ................... 365/108 |
| 4,860,273 A | 8/1989 | Sawano et al. |
| 4,883,741 A | 11/1989 | Takahashi et al. .......... 430/270 |
| 4,918,682 A | 4/1990 | Finegan ...................... 369/275 |
| 4,933,221 A | 6/1990 | Nishimura et al. ........... 428/64 |
| 4,970,707 A | 11/1990 | Hara et al. ................. 369/44.11 |
| 5,014,259 A | 5/1991 | Goldberg et al. ........... 369/284 |
| 5,019,476 A | 5/1991 | Kanno et al. ................. 430/20 |
| 5,023,859 A | 6/1991 | Eich et al. ................... 365/113 |
| 5,034,943 A | 7/1991 | Antonov et al. ............. 369/260 |
| 5,049,462 A | 9/1991 | Funhoff et al. |
| 5,063,555 A | 11/1991 | Miyoshi et al. ................ 369/97 |
| 5,077,724 A | 12/1991 | Gregg |
| 5,090,008 A | 2/1992 | Clark et al. .................. 369/284 |
| 5,090,009 A | 2/1992 | Hamada et al. ............. 369/284 |
| 5,098,975 A | 3/1992 | Omelis et al. ............... 526/312 |
| 5,109,374 A | 4/1992 | Tsunoda et al. ............. 369/100 |
| 5,124,183 A | 6/1992 | Nakano et al. ................. 428/1 |
| 5,188,863 A | 2/1993 | De Graaf et al. ............ 427/512 |
| 5,205,178 A | 4/1993 | Odernheimer ........... 73/863.12 |
| 5,215,800 A | 6/1993 | Daido et al. .................. 428/64 |
| 5,234,799 A | 8/1993 | Nagae et al. ................. 430/345 |
| 5,272,689 A | 12/1993 | Tsujioka et al. ............. 369/112 |
| 5,289,407 A | 2/1994 | Strickler et al. ............. 365/106 |
| 5,297,132 A | 3/1994 | Takano et al. ............... 369/284 |
| 5,311,499 A | 5/1994 | Hwang .................... 369/275.2 |
| 5,312,713 A | 5/1994 | Yokoyama et al. ......... 430/200 |
| 5,368,789 A | 11/1994 | Kamitakahara et al. .... 264/1.33 |
| 5,369,631 A | 11/1994 | Hwang ....................... 369/113 |
| 5,382,463 A | 1/1995 | Adkins et al. ............... 428/141 |
| 5,447,767 A | 9/1995 | Tanabe et al. .............. 428/64.4 |
| 5,459,019 A | 10/1995 | Kato et al. .................. 430/271 |
| 5,508,143 A | 4/1996 | Taniguchi et al. ..... 430/270.21 |
| 5,509,991 A | 4/1996 | Choi ........................ 156/245 |
| 5,510,171 A | 4/1996 | Faykish ...................... 428/195 |
| 5,519,517 A | 5/1996 | Redfield et al. ............... 359/22 |
| 5,572,492 A | 11/1996 | Ogawa ......................... 369/14 |
| 5,587,993 A | 12/1996 | Gregg ......................... 369/291 |
| 5,627,817 A | 5/1997 | Rosen et al. ................... 369/58 |
| 5,639,588 A | 6/1997 | Huh ....................... 430/270.15 |
| 5,658,411 A | 8/1997 | Faykish ...................... 156/233 |
| 5,669,995 A | 9/1997 | Hong ........................ 156/74 |
| 5,744,219 A | 4/1998 | Tahara ........................ 428/195 |
| 5,764,583 A | 6/1998 | Cliff et al. ............. 365/230.03 |
| 5,800,950 A | 9/1998 | Hirao et al. .................... 430/1 |
| 5,838,653 A | 11/1998 | Fan et al. ................. 369/275.1 |
| 5,843,626 A | 12/1998 | Ohta et al. ................... 430/320 |
| 5,851,615 A | 12/1998 | Kay .......................... 428/40.1 |
| 5,855,979 A | 1/1999 | Umehara et al. .......... 428/64.1 |
| 5,866,236 A | 2/1999 | Faykish et al. |
| 5,871,881 A | 2/1999 | Nishida et al. ........ 430/270.11 |
| 5,879,774 A | 3/1999 | Taylor et al. .............. 428/64.1 |
| 5,890,674 A | 4/1999 | Major ........................ 242/587 |
| 5,908,803 A | 6/1999 | Leconte et al. ............... 502/27 |
| 5,958,650 A | 9/1999 | Wolleb et al. ......... 430/270.19 |
| 5,998,007 A | 12/1999 | Prutkin et al. ............. 428/320.2 |
| 6,016,210 A | 1/2000 | Stappaerts ................... 359/10 |
| 6,016,984 A | 1/2000 | Trafton et al. ............ 242/348.1 |
| 6,168,682 B1 | 1/2001 | Bennett et al. .............. 156/295 |
| 6,236,589 B1 | 5/2001 | Gupta et al. ................. 365/151 |
| 6,266,166 B1 | 7/2001 | Katsumata et al. ............. 359/3 |
| 6,338,935 B1 | 1/2002 | Alperovich et al. ... 430/270.11 |
| 6,310,850 B1 | 4/2002 | Sochava et al. ............. 369/103 |
| 6,364,233 B1 | 4/2002 | Crowley ................... 242/332.8 |
| 6,372,341 B1 | 4/2002 | Jung et al. ................... 428/354 |
| 6,383,690 B1 | 5/2002 | Vargas ............................ 430/5 |
| 6,386,458 B1 | 5/2002 | Leiber et al. ................. 235/487 |
| 6,436,483 B2 | 8/2002 | Palmasi et al. .............. 427/510 |
| 6,450,642 B1 | 9/2002 | Jethmalani et al. ......... 351/219 |
| 6,452,890 B2 | 9/2002 | Kawano et al. ........ 369/110.01 |
| 6,714,437 B1 | 3/2004 | Leiber et al. ................. 365/151 |
| 6,789,262 B1 | 9/2004 | Leiber et al. ................. 720/746 |
| 7,024,675 B1 * | 4/2006 | Leiber et al. ................. 720/746 |
| 7,054,261 B1 * | 5/2006 | Leiber et al. ................. 369/283 |
| 2003/0096105 A1 | 5/2003 | Noehte et al. ............... 428/332 |
| 2003/0142619 A1 | 7/2003 | Mussig et al. ............... 369/273 |
| 2003/0156524 A1 | 8/2003 | Stadler et al. ............... 369/103 |
| 2003/0161018 A1 | 8/2003 | Stadler et al. .................. 359/3 |
| 2003/0165105 A1 | 9/2003 | Leiber et al. ........... 369/110.01 |
| 2003/0165746 A1 | 9/2003 | Stadler et al. .................. 430/1 |
| 2003/0169674 A1 | 9/2003 | Leiber et al. ................. 369/272 |
| 2003/0179277 A1 | 9/2003 | Stadler et al. ............... 347/224 |
| 2003/0235136 A1 | 12/2003 | Akselrod et al. ............ 369/108 |
| 2004/0009406 A1 | 1/2004 | Hesselink et al. .............. 430/1 |
| 2004/0030732 A1 | 2/2004 | Gerspach et al. ............ 708/111 |
| 2004/0036187 A1 | 2/2004 | Leiber et al. ................. 264/1.7 |
| 2004/0051919 A1 | 3/2004 | Noehte et al. .................. 359/3 |
| 2004/0053140 A1 | 3/2004 | Stadler et al. .................. 430/1 |
| 2004/0066546 A1 | 4/2004 | Noehte et al. .................. 359/1 |
| 2004/0136037 A1 | 7/2004 | Leiber et al. ................... 359/1 |
| 2004/0136040 A1 | 7/2004 | Noehte et al. ................ 359/35 |
| 2004/0145788 A1 | 7/2004 | Leiber et al. .................... 359/3 |

FOREIGN PATENT DOCUMENTS

| | | |
|---|---|---|
| DE | 2910390 | 10/1979 |
| DE | 3110583 | 1/1982 |
| DE | 3723522 | 2/1989 |
| DE | 3810722 | 6/1991 |
| DE | 19537829 | 10/1996 |
| DE | 68926896 | 12/1996 |
| DE | 6922527 | 4/1998 |
| DE | 19808288 | 9/1999 |
| DE | 298 16 802 U | 2/2000 |
| DE | 298 16 802 UI | 3/2000 |
| DE | 199 35 766 A | 2/2001 |
| DE | 19947782 | 4/2001 |
| DE | 10039370 | 2/2002 |
| DE | 10039374 | 2/2002 |
| DE | 10039372 | 3/2002 |
| DE | 3920420 | 1/2003 |
| DE | 10128902 | 10/2003 |
| EP | 0 323 167 | 7/1989 |
| EP | 0 352 194 | 1/1990 |
| EP | 0 360 144 | 3/1990 |
| EP | 0 384 041 | 8/1990 |
| EP | 0 403 971 | 12/1990 |
| EP | 0 410 205 | 1/1991 |
| EP | 0 421 761 | 4/1991 |
| EP | 0 458 604 | 11/1991 |
| EP | 0 475 336 | 3/1992 |
| EP | 0 514 589 | 11/1992 |
| EP | 0 519 633 | 12/1992 |
| EP | 0 528 134 | 2/1993 |
| EP | 0 552 887 | 7/1993 |
| EP | 0 585 076 | 3/1994 |
| EP | 0 613 126 | 3/1994 |
| EP | 0 615 233 | 9/1994 |
| EP | 0 660 262 | 6/1995 |
| EP | 0 750 308 | 12/1996 |
| EP | 0 768 353 | 4/1997 |

| | | |
|---|---|---|
| EP | 0 938 255 | 8/1999 |
| FR | 2703815 | 10/1994 |
| GB | 2211760 | 7/1989 |
| JP | 55-080832 | 6/1980 |
| JP | 58-155543 | 9/1983 |
| JP | 61-145746 | 7/1986 |
| JP | 62-231437 | 10/1987 |
| JP | 63-039381 | 2/1988 |
| JP | 63-304429 | 12/1988 |
| JP | 1-190494 | 7/1989 |
| JP | 1-256042 | 10/1989 |
| JP | 2-98822 | 4/1990 |
| JP | 2-105346 | 4/1990 |
| JP | 2-118632 | 5/1990 |
| JP | 3-23517 | 1/1991 |
| JP | 3-134852 | 6/1991 |
| JP | 3-147540 | 6/1991 |
| JP | 3-164293 | 7/1991 |
| JP | 4-197781 | 7/1992 |
| JP | 5-046061 | 2/1993 |
| JP | 5-109234 | 4/1993 |
| JP | 5109121 | 4/1993 |
| JP | 5-334749 | 12/1993 |
| JP | 6-20292 | 1/1994 |
| JP | 60-52941 | 2/1994 |
| JP | 6-60461 | 3/1994 |
| JP | 61-99981 | 7/1994 |
| JP | 8-273325 | 10/1996 |
| JP | 9-171235 | 6/1997 |
| WO | 00/54112 | 9/2000 |
| WO | 01/09884 A | 2/2001 |
| WO | 00/17864 | 5/2002 |
| WO | 01/84544 | 9/2003 |
| WO | 02/15179 | 9/2003 |
| WO | 02/46845 | 3/2004 |
| WO | 01/04880 | 9/2004 |

OTHER PUBLICATIONS

Optimem Das Projekt OptiMem verfolgt im Wesentlichen drei Ziele: pp. 1-8.

CHIP Das Computer Magazine, Industrie Baut Auf Plastik, Tesa-Film als Giga-Speicher, pp. 194-198 (1998).

Ramanujam et al., "Instant Holography" Applied Physics Letters, vol. 74 (21) pp. 3227-3229 (May 1999).

CHIP Das Computer-Magazin, Sep. 8, 1998, pp. 194-198.

* cited by examiner

METHOD FOR INPUTTING INFORMATION INTO A DATA STORAGE MEDIUM THAT IS OPTICALLY RECORDABLE AND READABLE

This application is the US national phase of international application PCT/EP02/06339, filed in English on 10 Jun. 2002, which designated the U.S. PCT/EP02/06339 claims priority to DE Application No. 101 28 901.4 filed 15 Jun. 2001. The entire contents of these applications are incorporated herein by reference.

The invention relates to a method of entering information into an optically writable and readable data storage medium, and also to the use of a data storage medium in conjunction with such a method.

DE 298 16 802 U1 discloses an optically writable and readable data storage medium which has a polymer film whose refractive index can be changed locally by heating. If the polymer film is heated locally with the aid of a write beam, the change in the refractive index results in a change in the reflecting power (reflectivity) at the point considered. This can be used for storing information. In order to read out the information, a read beam is used, which is reflected more intensely at points with increased reflectivity, which may be measured in order to acquire the information. The polymer film, which, for example, consists of polypropylene, can be prestressed (stretched) in both surface directions during production, as a result of which a high amount of inherent energy is stored in the material. In the event of local heating by the write beam, in such a configuration of the polymer film, a sharp material change (compaction) takes place as a result of reformation, the refractive index changing in the desired way. In the case of the previously known data storage medium, the polymer film can be assigned an absorber dye which preferentially absorbs the write beam and gives up the heat produced in the process locally to the polymer film. With the aid of an absorber dye, a sufficiently high change in the refractive index (for example a change of about 0.2) can be achieved even with a relatively low intensity of the write beam.

In the previously known data storage medium, the polymer film is wound spirally in a plurality of plies onto a core, there being an adhesion layer between adjacent plies in each case. By focusing the write beam or read beam, the information may be written specifically into a preselected polymer film ply or read out from it.

A main problem with such spirally wound multi-ply data storage media is the low transmission after a plurality of plies, which is caused by the absorber dye. In the case of a preferred optical density between 0.30 and 0.35 per ply, after 15 plies an optical density of 5 is reached, which corresponds to a transmission of only 0.001%. The optical density D is a variable which is well suited to characterizing the absorption behavior; it is true that $D=\log(1/T)$, where $T=I/I_0$ is the transmission if the intensity of the incident radiation falls from $I_0$ to $I$. At higher optical densities per ply, a transmission value of 0.001% is already reached at a lower number of transilluminated plies. This makes writing data into plies lying at a deeper level virtually impossible, since all of the energy of the write beam, which is needed to change the optical properties of the polymer film, is already absorbed in the plies lying higher up and transilluminated first. Reading data with the aid of the read beam is affected even more detrimentally, since reading out the information is carried out in reflection, so that the read beam has to trace a path within the data storage medium which is twice as long as that traced by the write beam during the writing operation.

In DE 100 28 113, it is proposed to introduce the absorber dye in oriented fashion in the previously known data storage medium. By changing the polarization of a laser used to generate the write beam and the read beam during writing and reading, it is then possible for the laser beam to be absorbed during writing but not during reading. However, this measure only simplifies the reading operation, while the writing operation in plies lying at a deeper level is still hindered by the high optical density.

It is an object of the invention to provide a possible way to achieve acceptable transmission properties in an optically writable and readable data storage medium with an absorber dye, so that, in particular in the case of a spirally wound multi-ply data storage medium of the aforementioned type, as far as possible neither the writing operation nor the reading operation in the layers lying at a deeper level is hindered.

This object is achieved by a method of entering information into an optically writable and readable data storage medium as claimed in claim 1 and the use of such a data storage medium as claimed in claim 18. Advantageous refinements of the invention emerge from the subclaims.

The method according to the invention is used for entering information into an optically writable and readable data storage medium having a polymer film which can be changed locally by heating in order to store information. The polymer film is assigned an absorber dye which is set up to absorb a write beam, at least partly, and to give up the heat produced in the process, at least partly, locally to the polymer film. A data storage medium of this type as such is known, for example from DE 298 16 802 U1, DE 100 28 113 or DE 199 35 776 A1. In the method, the absorber dye is heated locally in accordance with the information to be entered by means of a pulsed write beam in a predetermined region of the polymer film. According to the invention, the absorption properties of the absorber dye are changed by means of light.

As a result of changing the absorption properties of the absorber dye, the write beam and/or a read beam used to read out information during a subsequent writing or reading operation are no longer seriously hindered by the absorber dye. The method according to the invention is therefore suitable in particular for data storage media in which the polymer film is arranged in multiple plies, the write beam being focused onto a preselected polymer film ply or the associated absorber dye when entering information. If such a data storage medium is, for example, written from outside to inside and the absorption properties of the absorber dye are correspondingly changed from outside to inside, the data storage medium has an adequately high transmission for all the following writing and reading operations.

It is preferable if, following the action of the pulsed write beam, the absorption properties of the absorber dye are changed in the predetermined region of the polymer film by means of a fixing beam. Preferred absorber dyes can be bleached (see below) and can therefore be bleached with the aid of the fixing beam, so that they do not hinder the transmission of the write beam or a read beam. A focused laser beam in the continuous wave mode may be used as a fixing beam.

Thus, for example, in an advantageous refinement of the method, a pulsed write beam focused onto a diameter of 0.5 µm, for example, is used. The write beam heats the absorber dye in a predetermined region of the polymer film used for information storage (for example in a preselected track in a preselected polymer film ply of a multi-ply data storage medium). The absorber dye, which, for example, is contained in the polymer film but can also be arranged in a separate layer on the polymer film, transfers the heat to the polymer film, which is changed locally as a result (for example in refractive index and/or in reflective behavior). The fixing beam follows the write beam, here a focused laser beam in the continuous wave (CW) mode, somewhat wider than the write beam, which bleaches the absorber dye no longer needed track by track in the region considered after the writing operation, that is to say removes the absorber dye, so to speak, like a rubber eraser. No high requirements are placed on the fixing beam in terms of quality. The beam profile and the stability are of subordinate importance; it is merely necessary to ensure that the power is sufficient to bleach the absorber dye. Furthermore, the fixing beam should have no detrimental effect on the absorber dye in regions (for example adjacent tracks or polymer film plies) which are subsequently still to be written.

The designation "fixing beam" is selected in analogy with a photographic process in which, in the fixing operation, excess light-sensitive material is removed from a photographic film. This analogy illustrates a further advantage of the method according to the invention: changing the absorption properties of the absorber dye prevents subsequent inadvertent changing of the information entered.

As already mentioned, in a preferred refinement of the invention, the absorber dye can be bleached and it is at least partly bleached in order to change its absorption properties. Absorber dyes which are particularly suitable for this purpose are dyes which are not particularly lightfast and can therefore be bleached easily. Typical examples of such dyes are azo and diazo dyes. Under the action of light, they are subject to continual cis-trans isomerization, which ultimately leads to destruction of the chromophoric system. In addition, the cyanin and phthalocyanin dyes known from CD-ROM technology can be bleached relatively easily.

In addition to dyes which can be bleached, photochromic and thermochromic dyes are also suitable as an absorber dye. Photochromic dyes, such as spiro compounds, change their structure and therefore their color under irradiation of light of suitable wavelength. If, following the conversion, the compound has a color which is no longer absorbed by the write beam and/or read beam, the purpose is fulfilled in exactly the same way as in the case of a bleachable dye.

In the case of thermochromic compounds, a structure change and therefore a color change occurs as a result of heating. When the method is carried out, this color change is achieved by the absorber dye absorbing the fixing beam and converting its light energy into heat energy.

The changes in the case of thermochromic and photochromic dyes are often reversible, which can be advantageous for specific applications.

In general, it is true that the write beam must heat the polymer film locally in order to enter information, specifically via the associated absorber dye. The write beam is therefore operated in the pulsed mode (for example with short pulses of less than about 1 µs duration). In the case of the action of the fixing beam on the absorber dye, on the other hand, the associated region of the polymer film should not be changed, that is to say this region may be heated only slightly. For the fixing beam, therefore, a laser beam in the continuous wave mode which has a lower intensity than the write beam is suitable.

Apart from the application of a fixing beam to a predetermined region of the polymer film, preferably directly following the entering of information into this region with the aid of the write beam, there is also the possibility that the absorption properties of the absorber dye in the data storage medium will be changed as a whole, after the action of the pulsed write beam on the data storage medium has been completed. For this purpose, the data storage medium is, for example, irradiated over the entire area with ultraviolet light, in order to bleach all of the absorber dye contained in the data storage medium. After that, no further information can be entered. The low expenditure as compared with the use of a fixing beam is advantageous. However, there is the disadvantage that only the reading operations are made easier since, during the writing operations, the absorber dye must still be present and thus has a detrimental effect on the transmission of the write beam.

If the polymer film in the data storage medium is arranged in a multiplicity of plies, there is preferably in each case an adhesion layer, which optionally contains absorber dye, between adjacent polymer film plies. The refractive index of the adhesion layer preferably differs only slightly from the refractive index of the polymer film, in order that no undesired reflections occur at the interfaces between an adhesion layer and a polymer film ply, which have a detrimental effect on the transmission of the write beam or of the read beam. On the other hand, small differences between the refractive indices of the polymer film plies and the adhesion layers can be utilized for formatting the data storage medium. The difference in the refractive indices is preferably so small that the reflection at the interface is below 4% or, even better, below 1%. Particularly beneficial conditions may be achieved if the difference in the refractive indices is less than 0.005.

In the case of a multi-ply data storage medium, the polymer film is preferably wound spirally. In this way, with the aid of a single polymer film, a multi-ply structure of the data storage medium may be achieved, which permits a high storage density and a high storage capacity. In this case, the data storage medium preferably has an optically transparent core which is set up to accommodate a writing and reading device of a drive matched to the data storage medium. The drive can have a writing and/or reading head which moves in the interior of the transparent core, relative to the data storage medium, which is at rest, or in which the write and/or read beam is coupled into the data storage medium via moving optical elements. Since, in this case, the data storage medium itself is at rest, it does not need to be balanced with regard to a rapid rotational movement.

The polymer film used as the data carrier is preferably stretched, for example by being prestressed in two mutually perpendicular directions within its plane during production. This leads to a high energy density being stored in the film material. As a result of the deposition of a relatively low quantity of energy per unit area with the aid of the write beam, an intense material change (for example material compaction) can then be obtained by reformation which, for example, results in a local change in the refractive index and a change in the optical path length in the material. The change in the refractive index in the region which is heated locally by the write beam is preferably of the order of magnitude of 0.2, which leads to a change in the local reflectance, which may easily be detected with the aid of a read beam.

Preferred materials for the polymer film are polypropylene, polyethylene terephthalate (PET), polyethylene naphthalate (PEN), polymethylpentene (PMP; also poly-2-methylpentene), polyvinylchloride and polyimide. While biaxially oriented polypropylene (BOPP) and polyvinylchloride (PVC) are particularly cost-effective, the other materials mentioned have a crystallite melting point of at least 170° C., which leads to increased long-term stability.

Figure 2:
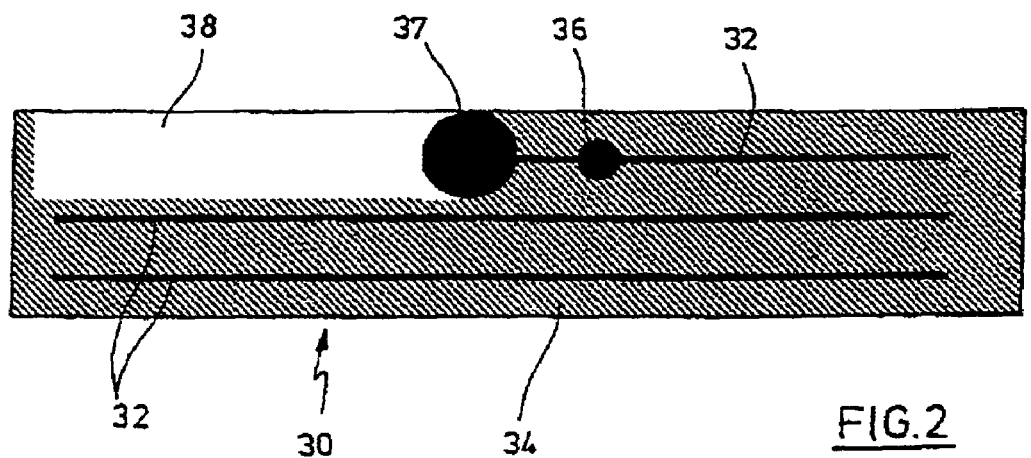

In the following text, the invention will be explained further using exemplary embodiments. In the drawings:

FIG. 1 shows a data storage medium with a spirally wound polymer film used for information storage, parts of a drive being arranged in the central region of the data storage medium, and FIG. 2 shows a detail from one ply of the data storage medium, which is illustrated flat for the purpose of illustration, in a schematic plan view.

FIG. 1 shows, in a schematic illustration, a data storage medium 1 and a writing and reading device 2 of a drive matched to the data storage medium 1. The data storage medium 1 has a number of plies 10 of a polymer film 11 used as an information carrier, which is wound spirally onto an optically transparent core. The sleeve-like core is not illustrated in FIG. 1 for reasons of clarity; it is located inside the innermost ply 10. For better illustration, the individual plies 10 of the polymer film 11 are shown in FIG. 1 as concentric circular rings, although the plies 10 are formed by winding the polymer film 11 spirally. In each case an adhesion layer 12 is arranged between adjacent plies 10 of the polymer film 11. For reasons of clarity, the adhesion layers 12 are drawn with an enlarged thickness in FIG. 1, not to scale.

In the exemplary embodiment, the polymer film 11 consists of biaxially oriented polypropylene and has been prestressed in both surface directions before being wound. In the exemplary embodiment, the polymer film 11 has a thickness of 35 µm; other thicknesses in the range from 10 µm to 100 µm or else thicknesses lying outside this range are likewise conceivable. The adhesion layers 12 are free of gas bubbles and, in the exemplary embodiment, consist of acrylate adhesive with a thickness of 23 µm, preferred layer thicknesses being between 1 µm and 40 µm. Instead of an acrylate adhesive, a varnish, for example, can also be used for the adhesion layers.

Arranged on the polymer film 11 is an absorber layer, which contains an absorber dye (see below) which is embedded in a matrix of polymethyl methacrylate (PMMA). The thickness of the absorber layer is preferably less than 0.5 µm and, in the exemplary embodiment, is 0.4 µm. The wound data storage medium 1 thus has a layer structure in which in each case a ply 10 of the polymer film 11 is followed by an absorber layer and then an adhesion layer 12.

In the exemplary embodiment, the data storage medium 1 contains twenty plies 10 of the polymer film 11 and has an external diameter of about 30 mm. The height of the core is 19 mm. A different number of plies 10 or other dimensions are likewise possible. The number of windings or plies can lie, for example, between ten and thirty, but can also be greater than thirty.

The writing and reading device 2 arranged in the interior of the core contains a writing and reading head 20 which, with the aid of a mechanism 21, can be rotated and moved axially to and fro in the directions of the arrows shown. The writing and reading head 20 has optical elements with the aid of which a light beam (for example with a wavelength of 630 nm or 532 nm) produced by a laser not illustrated in FIG. 1 can be focused onto the individual plies 10 of the polymer film 11. Since the writing and reading head 20 is moved with the aid of the mechanism 21, it is able to scan all the plies 10 of the data storage medium 1 completely. In the exemplary embodiment, the data storage medium 1 is at rest. It therefore does not need to be balanced with regard to a high rotational speed (and does not have to be unwound or spooled either). For reasons of clarity, the elements provided for balancing the writing and reading head 20 are not shown in FIG. 1. The aforementioned laser is located outside the writing and reading head 20 and is stationary; the laser beam is deflected into the writing and reading head 20 by optical elements.

In order to enter or write information into the data storage medium 1, the laser in the exemplary embodiment is operated with a beam power of about 10 mW. In this case, the laser beam is used as a write beam and is focused onto a preselected ply 10 of the polymer film 11 (or the absorber layer on the polymer film 11 in this ply 10), so that the beam spot is smaller than 1 µm. The light energy is in this case introduced in the form of short pulses of less than 1 µs duration. The energy of the write beam is absorbed in the beam spot, primarily by the absorber dye, which leads to local heating of the polymer film 11 and therefore to a local change in the refractive index and the reflecting behavior. During the writing operation, the write beam is defocused in the plies adjacent to the ply 10 considered of the polymer film 11, so that the adjacent plies of the polymer film 11 and the associated absorber dye are locally heated only slightly and the stored information is not changed there.

In the polymer film 11, the information units are formed by changing the optical properties in a region with a preferred size of less than 1 µm. In the process, the information can be stored in binary form, that is to say the local reflectivity assumes only two values at the location of an information unit. This means that, if the reflectivity is above a defined threshold value, a "1", for example, is stored at the considered location of the information carrier, and if it is below this threshold value or below another, lower threshold value, accordingly a "0". However, it is also conceivable to store the information in a plurality of gray stages. This is possible if the reflectivity of the polymer film at the location of an information unit can be changed in a specific manner by means of defined setting of the refractive index, without saturation being reached in the process.

FIG. 2 is a schematic illustration of a detail 30 of one ply 10 of the polymer film 11 with the absorber dye contained in the adjacent absorber layer. For reasons of clarity, the detail 30 is placed in the plane of the paper, although the polymer film 11 in the data storage medium 1 is wound and is therefore curved.

With the aid of the write beam, the information units are entered along preformatted tracks 32. For this purpose, the write beam, as already explained, is focused onto the polymer film 11 or the absorber layer arranged on the latter. This leads to local heating of the absorber dye 34, shown hatched in FIG. 2, and therefore to a local change of the polymer film 11. The region of the focus of the write beam is designated 36 in FIG. 2. Its diameter is preferably about 0.5 µm.

According to the invention, the absorption properties of the absorber dye 34 are changed after the desired information units have been written into a predetermined region of the polymer film 11 (the upper track 32 here). For this purpose, use is made in the exemplary embodiment of a fixing beam 37 which bleaches the absorber dye 34. This therefore produces a bleached region 38, in which the absorber dye no longer absorbs the write beam and a read beam or at least does so only to a considerably lesser extent.

In the exemplary embodiment, the fixing beam 37 has a larger region of the focus than the write beam 36, as can be seen in FIG. 2. Accordingly, the intensity (power per unit area) is lower. In the exemplary embodiment, the fixing beam 37 follows the write beam 36, that is to say, in the illustration according to FIG. 2, the track 32 is written from left to right with the aid of the write beam 36 and, immediately thereafter, the fixing beam 37 bleaches the absorber dye 34. In the exemplary embodiment, the fixing beam 37 is produced by a separate laser, which is operated in the continuous wave mode (CW mode) with a power of 10 mW and at a wavelength of 650 nm. The writing and reading head 20 is also used to inject the fixing beam 37; however, details relating to this are not shown in the schematic illustration according to FIG. 1.

Alternatively, it is conceivable to use the same laser and the same optics both for the write beam and for the fixing beam. For this purpose, for example, the laser is firstly operated in a pulsed manner to provide the write beam, in order to enter the desired information into a predetermined region of the polymer film 11 (for example a track or a section of a track). After that, the laser is switched into CW mode and the laser beam is defocused somewhat, in order to move over this region again as a fixing beam and in the process to bleach the absorber dye.

In the exemplary embodiment, the absorber dye is "Fettschwarz [literally: grease black] (Fluka 46300)". This is an azo dye which may easily be bleached. The absorber dye is contained in the absorber layer in the exemplary embodiment, specifically in a concentration such that, with the given thickness of the absorber layer, the result is an optical density of about 0.3 at the light wavelength of the write beam. The optical density can be lower, but also higher, since the absorber dye does not hinder the transmission of the write beam or of a read beam further if the data storage medium is, for example, written from inside to outside and the excess absorber dye is bleached, as explained, after a writing operation.

The optical density is a variable which is well suited to characterizing the absorption behavior. For the optical density D, it is true that:

$$D = \log(1/T) = \epsilon_\lambda c \, d$$

Here, $T = I/I_0$ is the transmission through a layer of thickness d, the intensity of the incident radiation falling from $I_0$ to I, $\epsilon_\lambda$ is the extinction coefficient at the wavelength $\lambda$ used (concentration-independent material parameter), and c is the concentration of the absorber dye.

In order to read stored information out of the data storage medium 1, the laser used for the write beam in the exemplary embodiment is operated in the CW mode. Depending on the stored information, the read beam focused onto the desired location is reflected, and the intensity of the reflected beam is registered by a detector in the writing and reading device 2.

The invention claimed is:

1. A method of entering information into an optically writable and readable data storage medium having a polymer film which can be changed locally by heating in order to store information and to which there is assigned an absorber dye which is set up to absorb a write beam, at least partly, and to transfer the heat produced in the process, at least partly, locally to the polymer film, comprising the steps of:
   (1) local heating of the absorber dye in accordance with the information to be entered by means of a pulsed write beam in a predetermined region of the polymer film,
   (2) changing the absorption properties of the absorber dye by means of light.

2. The method as claimed in claim 1, wherein, following the action of the pulsed write beam, the absorption properties of the absorber dye are changed in the predetermined region of the polymer film by means of a fixing beam.

3. The method as claimed in claim 2, wherein the fixing beam used is a focused laser beam in the continuous wave mode.

4. The method as claimed in claim 1, wherein, after the conclusion of the action of the pulsed write beam on the data storage medium, the absorption properties of the absorber dye in the data storage medium are changed as a whole.

5. The method as claimed in claim 1, wherein the absorber dye can be bleached and is at least partly bleached in order to change its absorption properties.

6. The method as claimed in claim 1, wherein the absorber dye is photochromic and its color is changed when irradiated with light.

7. The method as claimed in claim 1, wherein the absorber dye is thermochromic and is heated when irradiated with light, its color being changed.

8. The method as claimed in claim 1, wherein the polymer film contains absorber dye.

9. The method as claimed in claim 1, wherein a layer which contains absorber dye is arranged on the polymer film.

10. The method as claimed in claim 1, wherein the polymer film is arranged in the data storage medium in a plurality of plies, and the write beam is focused onto a preselected polymer film ply or the associated absorber dye when information is being entered.

11. The method as claimed in claim 10, wherein an adhesion layer which optionally contains absorber dye is arranged between adjacent polymer film plies in each case.

12. The method as claimed in claim 11, wherein the refractive index of the adhesion layer differs only slightly from the refractive index of the polymer film.

13. The method as claimed in claim 10, wherein the polymer film is wound spirally.

14. The method as claimed in claim 13, wherein the data storage medium has an optically transparent core which accommodates a writing and reading device of a drive matched to the data storage medium.

15. The method as claimed in claim 1, wherein the refractive index of the polymer film is changed locally by heating.

16. The method as claimed in claim 1, wherein the polymer film is stretched.

17. The method as claimed in claim 1, wherein the polymer film has a material which is selected from the following group: polypropylene, polyethylene terephthalate, polyethylene naphthalate, polymethylpentene, polyvinylchloride, polyimide.

18. The use
   of an optically writable and readable data storage medium having a polymer film which can be changed locally by heating in order to store information and to which there is assigned an absorber dye which is set up to absorb a write beam, at least partly, and to transfer the heat produced in the process, at least partly, locally to the polymer film,
   in a drive in which, in order to enter information into the data storage medium, the absorber dye is heated locally in a predetermined region of the polymer film by means of a pulsed write beam in accordance with the information to be entered and, after that, the absorption properties of the absorber dye are changed by means of light.

19. The use as claimed in claim 18, the data storage medium and, respectively, the method carried out with the aid of the drive for entering information into the data storage medium additionally having the features as claimed in claim 2.

20. The method as claimed in claim 4, wherein the absorption properties of the absorber dye are changed by full-area irradiation with UV light.

21. The method as claimed in claim 16, wherein the polymer film is biaxially stretched.

* * * * *

UNITED STATES PATENT AND TRADEMARK OFFICE
CERTIFICATE OF CORRECTION

PATENT NO.       : 7,193,963 B2
APPLICATION NO.  : 10/480836
DATED            : March 20, 2007
INVENTOR(S)      : S. Stadler et al.

Page 1 of 1

It is certified that error appears in the above-identified patent and that said Letters Patent is hereby corrected as shown below:

Title Page; should read;
(22) PCT Filed: June 10, 2002

Signed and Sealed this

Fifth Day of June, 2007

JON W. DUDAS
*Director of the United States Patent and Trademark Office*